United States Patent [19]

Hatazaki et al.

[11] Patent Number: 4,926,483
[45] Date of Patent: May 15, 1990

[54] PATTERN RECOGNITION SYSTEM USING HUERISTIC SEARCH TECHNIQUE

[75] Inventors: Kaichiro Hatazaki; Takao Watanabe, both of Tokyo, Japan

[73] Assignee: NEC Corporation, Tokyo, Japan

[21] Appl. No.: 671,352

[22] Filed: Nov. 14, 1984

[30] Foreign Application Priority Data

Nov. 15, 1983 [JP] Japan .................. 58-214544

[51] Int. Cl.$^5$ .................................. G10L 5/06
[52] U.S. Cl. .................................. 381/43
[58] Field of Search .................. 381/41–45, 381/46–50; 364/513.5

[56] References Cited

U.S. PATENT DOCUMENTS

| 4,277,644 | 7/1981 | Levinson et al. | 381/43 |
| 4,336,421 | 6/1982 | Welch et al. | 381/43 |
| 4,400,788 | 8/1983 | Myers et al. | 381/43 |
| 4,624,010 | 11/1986 | Takebayashi | 381/43 |
| 4,625,287 | 11/1986 | Matsuura et al. | 381/43 |

FOREIGN PATENT DOCUMENTS 0125648 11/1984 European Pat. Off. .
58-55995 of 1983 Japan .

OTHER PUBLICATIONS

Jelinek, "Continuous Speech Recognition by Statistical Methods", Proc. IEEE, vol. 64, No. 4, 4/76, pp. 532–539.

Nakatsu et al., "An Acoustic Processor in a Conversational Speech Recognition System," Rev. Elec. Comm. Labs., vol. 26, No. 11-12 (11-12), 1978, pp. 1486 ∝ 1504.

Levinson, "Some Experiments with a Linguistic Processor for Continuous Speech Recognition", IEEE Trans. ASSP, vol. ASSP-31, No. 6, 12/83, pp. 1549–1556.

*Primary Examiner*—Gary V. Harkcom
*Assistant Examiner*—John Merecki
*Attorney, Agent, or Firm*—Sughrue, Mion, Zinn, Macpeak & Seas

[57] ABSTRACT

The input pattern to a pattern recognition system is defined as a candidate graph composed of several possibly valid category strings. The most valid category string is selected as the input pattern. Each category string is composed of linked category segments, each category segment being bounded by category nodes or branching points to which are connected one or more category segments. The most valid category string is developed by establishing the most valid midway path from the start node and extending to the terminal node. A most valid midway path to each midway node (n) is established by using the minimum valid estimation value determined for all possible midway paths from the start node to the midway node (n).

10 Claims, 2 Drawing Sheets

PATTERN RECOGNITION SYSTEM USING HUERISTIC SEARCH TECHNIQUE

BACKGROUND OF THE INVENTION:

The present invention relates to a pattern recognition system for recognizing an input pattern to output a category string as a recognition result and, more particularly, to an improvement in the pattern recognition system for selecting a valid category string as the recognition result from a category candidate graph which is obtained from the input pattern.

An input pattern can be recognized if the categories contained in the input pattern are recognized individually and linked together to form a category string. The thus obtained category string can be used as the recognition result of the input pattern.

It is, however, generally difficult to recognize the respective categories in the input pattern individually. Where the boundary between the categories in the input pattern is ambiguous, as in the case of speech or an utterrance pronounced continuously and which is to be recognized as a syllable sequence, it is difficult to determine the segments in which the individual categories of the input pattern are positioned.

Therefore, the following method has been used in the prior art, as is disclosed in Japanese Patent Laid-Open No. 58-55995 entitled "Speech Recognition System".

At the stage where the respective categories (e.g., syllables in the above-specified Japanese Patent Application) in the input pattern are to be recognized individually, several segments for the respective categories and several category candidates are obtained. The respective candidates are assigned measures for indicating the recognition accuracies. (These measure will be called "costs" in the following, with a lower cost representing a better recognition accuracy. Similarity data may be used to establish recognition accuracy.)

As a result, for the input pattern, there can be obtained a directed graph in which the boundaries of the category segments in the input pattern are used as nodes, in which a plurality of branches are provided for the plural categories corresponding to the category segments and in which the category names and the costs are assigned to the respective branches. This directed graph will be called a "candidate graph" hereinafter. The start point or start node and the terminal point or terminal node of the candidate graph correspond to the start point and terminal point of the input pattern, respectively. A plurality of paths are present in a region from the start node to the terminal node of the candidate graph and are respective candidates for the category string corresponding to the input pattern. Moreover, the cumulation of the costs of all the branches on the path is employed as the cost for that path.

The candidates of the plural category strings obtained from the candidate graph contain a correct recognition result, which is generally a significant category string having some validity. Therefore, the recognition performance can be improved if linked candidates, which are valid and have the lowest combined cost is selected from the candidates of the category strings and is used as the recognition result.

In order to judge the validity of the category string, however, it is necessary to look up words in a dictionary, which are stored with valid category strings, or to judge possibility of connection of the category strings, so that a number of calculations are generally required. Therefore, judgements of significances of the category strings for all the aforementioned paths are not practical because very many calculations are required.

Thus, there is adopted a method by which the judgement of significance of the category strings is started consecutively from the category string having the lower path cost. Even in this case, however, many calculations and much memory capacity are required because the category strings are extracted consecutively from those having the lower path costs after all of them are determined.

SUMMARY OF THE INVENTION:

It is, therefore, an object of the present invention to provide a pattern recognition system and method capable of reducing the number of calculations and the memory capacity necessary for the recognition.

Another object of the present invention is to provide a pattern recognition system with a high recognition accuracy.

Still another object of the present invention is to provide a speech recognition system which can recognize a continuously spoken utterance with high accuracy and with a small number of calculations.

According to the present invention, there is provided a pattern recognizing system comprising: input pattern parsing means for parsing an input pattern to output a candidate graph in which a plurality of segmenting points in the input pattern are used as nodes, in which at least one category corresponding to a segment defined by the segmenting points is used as the branch between the segmenting points and in which costs are assigned to the branches; candidate graph memory means for storing data for the candidate graph; minimum cost calculating means for calculating, for all the nodes of the candidate graph, the minimums of the costs of all paths from the nodes to terminal nodes to assign the minimums, as the minimum costs to the terminal, to the nodes; midway path memory means for storing data of the midway paths from the start node to arbitrary midway nodes; estimation calculating means for calculating an estimation factor for an arbitrary midway path based on the costs assigned to the branches of the paths and the minimum costs assigned to the end node of the midway path; best path selecting means for selecting the best midway path at an arbitrary instant during recognition from all the midway paths, that are stored in the midway path memory means, in accordance with the estimation factor evaluated by the estimation calculating means; validity judging means for parsing the midway path selected to judge whether a category string portion corresponding to the midway path forms at least a part of a valid recognition result or not and to output the midway path or the category string as the recognition result when the category string is valid and when the midway path reached the terminal end of the candidate graph; path forming means for extending the midway path from the end node thereof and for storing a plurality of new midway paths in the midway path memory means; and end judging means for judging, in accordance with at least either the recognition result outputted from the validity judging means or a signal from the outside, whether a predetermined end condition is satisfied or not to determine the end of the recognizing operation.

BRIEF DESCRIPTION OF THE DRAWINGS:

Other objects and features of the present invention will become apparent from the following description taken with reference to the accompanying drawings, in which.

Figure 1:
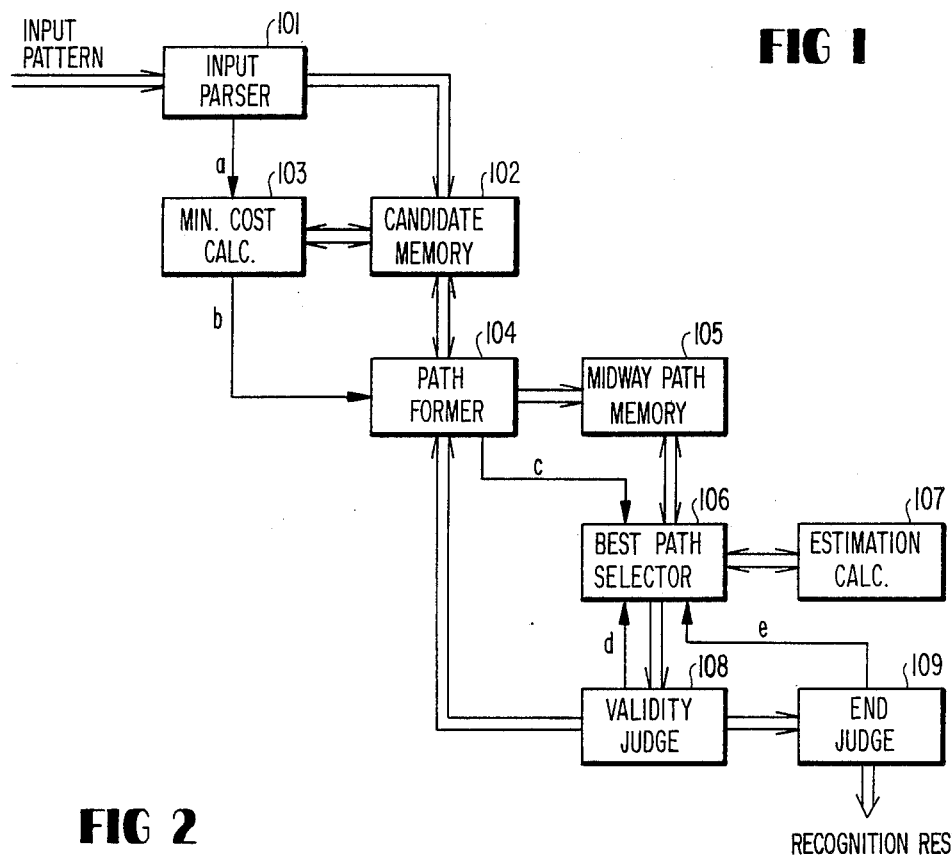
FIG. 1 is a block diagram showing one embodiment of the present invention.

DETAILED DESCRIPTION OF THE PREFERRED EMBODIMENT:

The pattern recognition system according to the present invention is an application of the principle of a heuristic search method, which is known in the field of artificial intelligence, so that a path having a low cost may be efficiently determined from all the paths running from the start node to the terminal node of a candidate graph. The fundamental principle of the present invention will be briefly described in the following.

An estimation factor f is defined for a midway path p which runs from the start node of the candidate graph to an arbitrary current node n between the start node and the terminal node. In the search, there are present a plurality of midway paths which correspond to a valid category string or its portion. This search is conducted by selecting and extending the midway path having the minimum estimation factor f from a plurality of midway ones. The searching efficiency is highly influenced by how the estimation factor f is determined. The estimation factor f should be estimated by evaluating the cumulated cost from the start node to the terminal node in case it is assumed that the midway path p can be extended, from the current node n, while retaining the validity, to reach the terminal node. Accurate estimation causes high search efficiency.

In the present invention the estimation factor f is determined in the following manner. The path, which passes the midway path p and reaches the terminal node and which has a valid category string, corresponds to the string of the category candidates for the respective segments in the input pattern. These category candidates are obtained by an input pattern parser, as will be described hereinafter, and are assigned larger costs when they are of lower reliabilities as candidates. Because of the erroneous recognition of the input pattern parser, all the category candidates for the respective segments in the input pattern, which form the valid category string, are not always the most reliable candidate, (i.e., the first candidate) but usually contain the second most reliable or less reliable ones in accordance with the recognition performance of the input pattern parser and the method for judgement of significance. Thus, the cumulated cost of those significant category strings takes a larger value than that of the category string composed of first candidates only, because it may contain the second and lower candidates.

In view of this fact, the estimation factor (also termed herein the estimation value) f (p,n) of the midway path p from the start node to the current node n is defined by the following formula (1):

$$f(p,n) = g(p) + h(n) \quad (1),$$

wherein: g(p) designates the cumulated cost of the midway path p itself, i.e., the cumulated value of the costs of all the category candidates contained in the midway path p; and h(n) is defined by the following formula (2):

$$h(n) = K \times c(n) \quad (2),$$

wherein c(n) designates the minimum of the cumulated costs from the current node n to the terminal node, i.e., the cumulated cost when the path from the midway node n to the terminal node is formed only of the first category (i.e. most reliable) candidates. From the foregoing description, the estimation h(n) of the cumulated costs of the valid category string from the current node n to the terminal node can be determined by multiplying the minimum cost c(n) by a coefficient K. In other words, this coefficient K is an average estimation of the ratio between the cumulated cost of the valid string from the current node n to the terminal node and the cumulated cost of the category string composed of the first category candidates, and its optimum value is dependent upon the input pattern, the performance of the parser and the judgement method for the validity.

The present invention will be described in detail in the following in connection with the accompanying drawings.

Figure 2:
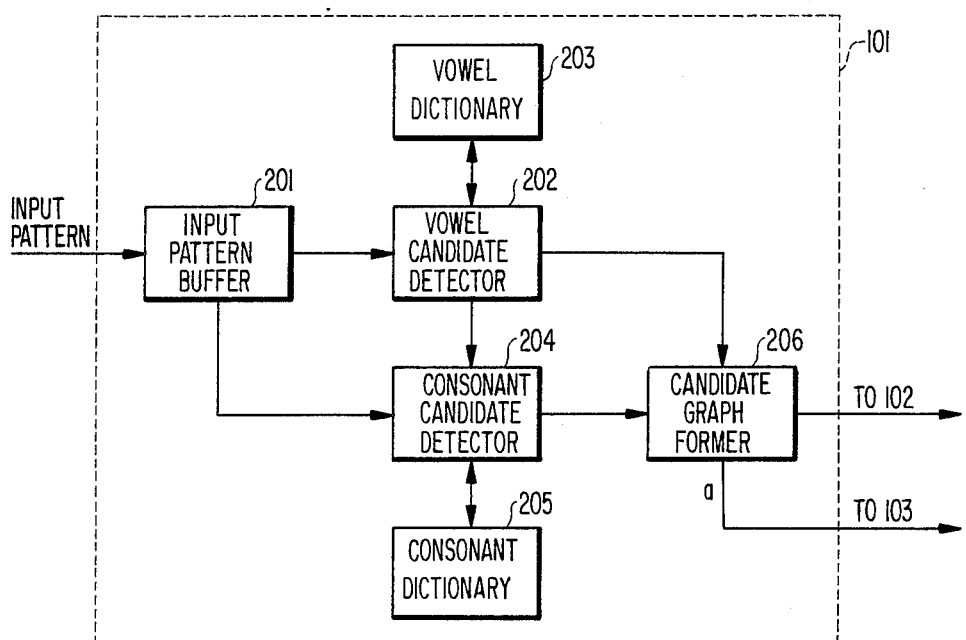
FIG. 2 is a block diagram showing one example of an input pattern parser shown in FIG. 1.

As shown in FIG. 1, an input pattern parser 101 parses an input pattern to output a candidate graph and suitable means is used as the parser in accordance with speeches, letters or various kinds of continuous or isolated input patterns. In the present embodiment, the input pattern parser, as shown in FIG. 2, is used so as to recognize a Japanese continuous speech as a syllable sequence.

A brief description will be made with reference to FIG. 2. For preparation, all the reference patterns of predetermined vowels, i.e., "a", "i", "u", "e" and "o" are stored in a vowel dictionary 203, and consonant-vowel (CV) reference patterns, e.g., "pu", "ku", "po", "ho", "si" or "zi" and vowel-consonant-vowel (VCV) reference patterns, e.g., "usi", "uzi", "ozi", "ire" or "ete" for the combinations of vowels and consonants are stored in a consonant dictionary 205.

The input pattern or the feature vector sequence of an input utterance is stored in an input pattern buffer 201. First, all vowel candidates in the input pattern are detected by a vowel candidate detector 202. Each of the vowel candidates is composed of the position of the vowel segment and the name of a vowel category (indicating the name of the vowel) in the input pattern. With all the sections of the input pattern, the vowel reference patterns read out from the vowel dictionary 203 are matched so that the position of the section, in which the vowel reference pattern having a matching distance shorter than a predetermined value, is incorporated together with the name of the vowel category into the vowel candidate.

Next, some consonant candidates are determined for each consonant candidate segment by a consonant candidate detector 204. Here, the "consonant candidate segment" is the segment, which extends from the start end of the input pattern to the front half of an arbitrary vowel segment (as will be called a "CV segment"), or extends from the rear half of the arbitrary vowel segment to the front half of the arbitrary vowel segment postposed after the former (as will be called a "VCV segment"), and which has a length shorter than a predetermined value (which is usually slightly longer than the maximum length of the VCV section). By matching the CV segment and the VCV segment with the CV reference patterns and the VCV reference patterns, respectively, which are read out from the consonant dictionary, a plurality of the consonant categories having matching distances shorter than a predetermined value are selected as the consonant candidates with those matching distances as the costs.

On the basis of the parsed results as above, a candidate graph former 206 forms and outputs the candidate graph in which the start point and the vowel candidates of the input pattern are used as the nodes, in which the consonant candidates are used as the branches between the nodes and in which the costs are assigned to the branches.

Figure 4:
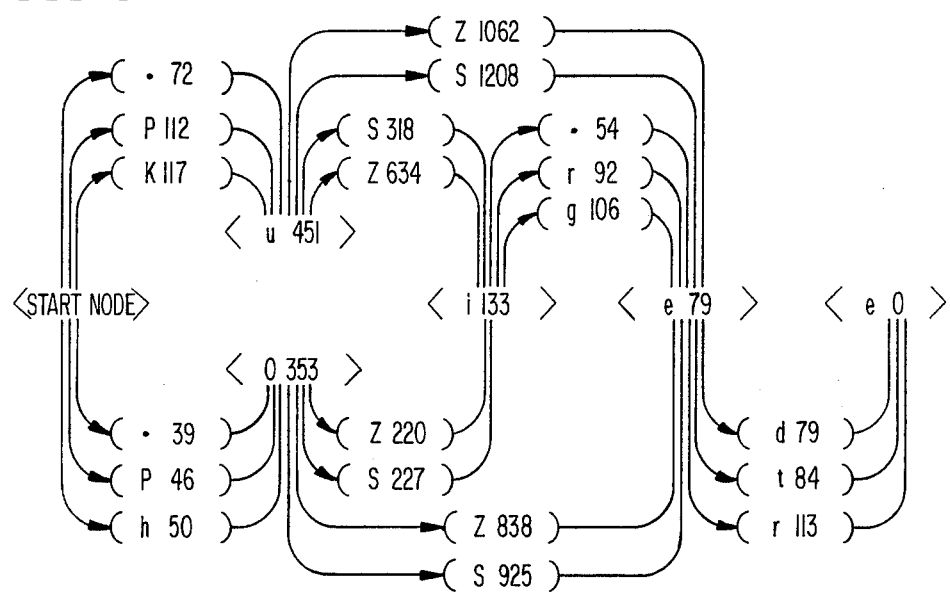
FIG. 4 is a diagram showing an example of a candidate graph.

FIG. 4 is a diagram showing an example of the candidate graph in which an utterance "oshiete (i.e., "teach me" in English)" is inputted. In FIG. 4, elements included in V-shaped brackets < > are the vowel candidates, in which alphabetic letters located at the left in the brackets designate the vowel category names whereas the numerals at the right designate the later-described minimum costs. On the other hand, arcs joining the two V-shaped brackets < > designate branches which have such consonant candidate indicated by rounded brackets. The lefthand alphabets in the rounded brackets designates the consonant category names, whereas the righthand numerals designate the costs of the branches. The quoted dots "." of the consonant category names imply absence of the consonants.

The following description will be made by taking up the candidate graph of FIG. 4 as an example.

In FIG. 1, the input pattern parser 101 stores the data (e.g., the nodes, categories, branches or costs) of the candidate graph in a candidate graph memory 102 and sends a calculation start signal a to a minimum cost calculator 103.

In response to the calculation start signal a, this minimum cost calculator 103 calculates the minimum costs from all the nodes of the candidate graph to the terminal node for said nodes, i.e., the values c(n) of the formula (2), to store them in the candidate graph memory 102. These calculations can be conducted efficiently by using the dynamic programming method. More specifically, when the nodes of the candidate graph are designated by n (n=1, ..., i, ..., j, ..., and N, wherein: 1 represents the start node; and N designates the terminal node), and when the costs of the branches from the node i to the node j are designated by d (i, j, m) (m=1, ..., and M (i, j), wherein M (i, j) represents the number of the branches between the nodes i and j), then the minimum costs c(n) of the node n can be derived from the following recurrence formula:

$$c(N) = 0 \text{ (i.e., the initial value),}$$

$$c(N) = \min_{n < j \leq N} [\min_m d(n, j, m) + c(j)], \quad (3)$$

$$(n = N, N - 1, \ldots, \text{ and } 1).$$

In the candidate graph of FIG. 4, the righthand numerals in the V-shaped brackets < > are the minimum costs determined. The minimum cost calculator 103 determines the minimum costs for all the nodes to store them in the candidate graph memory 102 and then sends a search start signal b to a path former 104.

Upon reception of the search start signal b, the path former 104 extracts the following six midway paths, which start from the start point of the candidate graph, from the candidate graph memory 102 to store them in a midway path memory 105:

[1, (. 72) <u 451>,]
[2, (p 112) <u 451>,]
[3, (k 117) <u 451>,]
[4, (. 39) <o 353>,]
[5, (p 46) <o 353>,]
[6, (h 50) <o 353>,]

After this, the path former 104 sends a selection start signal c to a best path selector 106. Here, the line of the vowel and consonant candidates enclosed by the brackets [ ] indicates one midway path. Moreover, the first lefthand numeral in the bracket is a number which is convenient for discriminating each midway path. For example, the midway path 1: [1, (. 72) <u 451>,] is one which runs from the start node to the vowel candidate <u 451> through the branch having the consonant candidate (. 72).

Upon reception of the selection start signal c, the best path selector 106 sends the costs of the branches of the respective paths and the minimum costs c(n) to an estimation calculator 107. This estimation calculator 107 calculates the estimation factor f(p,n) expressed by the formula (1) to select and extract the midway path having the least estimation value. More specifically, the estimation calculator 107 calculates the estimation factors f(p,n) of the respective midway paths in accordance with the formulas (1) and (2). As the value of K in the formula (2), 1.3 is used here. For the midway path 1, for example, $f(p,n)=72+586=658$ because $g(p)=72$ and $h(n)=1.3\times 451\simeq 586$. Incidentally, if the estimation value once calculated is stored in the midway path memory 105, it can be reused when the estimation value for the same midway path becomes necessary later. The estimation values for the above six midway paths are cumulated, as follows:

[1, (. 72) <u 451>, 658]
[2, (p 112) <u 451>, 698]
[3, (k 117) <u 451>, 703]
[4, (. 39) <o 353>, 498]
[5, (p 46) <o 353>, 505]
[6, (h 50) <o 353>, 509].

Here, the values located at the righthand sides of the commas in the brackets [ ] are those respective estimation values. Of these values, the best path selector 106 selects the following midway path 4 having the lowest value:

[4, (. 39)<0 353>, 498]

to send it to a validity judging unit 108 and to erase it from the midway path memory 105. Even if the erasure of the data of that midway path 4 is not conducted, the effect is naturally the same if the control of the readout from the midway path memory 105 is made.

Figure 3:
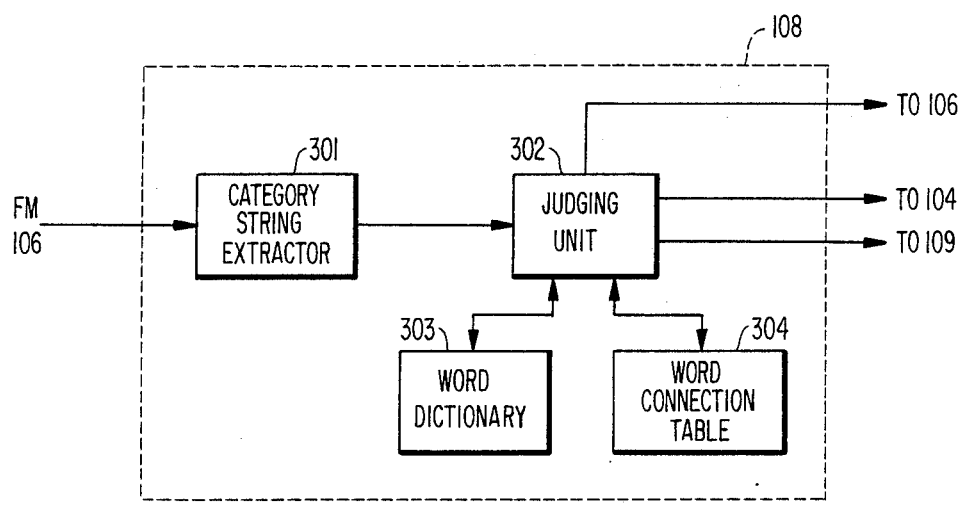
FIG. 3 is a block diagram showing one example of a validity judging unit shown in FIG. 1.

The validity judging unit 108 judges the validity of the midway path which is sent from the best path selector 106. The block diagram of the validity judging unit 108 of the present embodiment is shown in FIG. 3. In FIG. 3, first of all, a category string extractor 301 extracts the category string ". 0" from the data of the midway path 4 from the best path selector 106 and supplies it together with the other data of the midway path 4 to a judging unit 302. The judging unit 302 examines whether or not the word starting from the category string ". 0" is present in a word dictionary 303. In the present case, the judging unit 302 sends the midway path 4 to the path former 104.

The path former 104 extends the midway path 4 to store the following four new midway paths in the midway path memory 105:

[7, (. 39) <o 353> (z 220) <i 133>, ]
    [8, (. 39) <o 353> (s 227) <i 133>, ]
    [9, (. 39) <o 353> (z 838) <e 79>, ]
    [10, (. 39) <o 353> (s 925) <e 79>, ]

At this instant, the midway path memory 105 is stored with the midway paths 1, 2, 3, 4, 5, 6, 7, 8, 9, and 10. The best path selector 106 selects again the midway path of the minimum estimation value from those midway paths. For this operation, the estimation calculator 107 calculates the estimation values for the midway paths 7 to 10 like the above. For the midway path 7, for example, $f(p,n) = 259 + 173 = 432$ because $g(p) = 39 + 220 = 259$ and $h(n) = 1.3 \times 133 \approx 173$. As a result, the midway paths stored in the midway path memory 105 are, as follows:

[1, (. 72) <u 451>, 658]
    [2, (p 112) <u 451>, 698]
    [3, (k 117) <u 451>, 703]
    [5, (p 46) <o 353>, 505]
    [6, (h 50) <o 353>, 509]
    [7, (. 39) <o 353> (z 220) <i 133>, 432]
    [8, (. 39) <o 353> (s 227) <i 133>, 439]
    [9, (. 39) <o 353> (z 838) <e 79>, 980]
    [10, (. 39) <o 353> (s 925) <e 79>, 1067].

As a result, the best path selector 106 sends the midway path 7 having the minimum estimation value to the validity judging unit 108. This validity judging unit 108 sends the midway path 7 to the path former 104 because the word started with the category string ". ozi" of the midway path 7 is also present in the word dictionary 303.

Subsequently, the three new midway paths obtained by extending the paths 7 are likewise stored in the midway path memory 105 and the estimation may be calculated, then, the following eleven midway paths are obtained in the midway path memory 105:

[1, (. 72) <u 451>, 658]
    [2, (p 112) <u 451>, 698]
    [3, (k 117) <u 451>, 703]
    [5, (p 46) <o 353>, 505]
    [6, (h 50) <o 353>, 509]
    [8, (. 39) <o 353> (s 227) <i 133>, 439]
    [9, (. 39) <o 353> (z 838) <e 79>, 980]
    [10, (. 39) <o 353> (s 925) <e 79>, 1067]
    [11, (. 39) <o 353> (z 220) <i 133> (. 54) <e 79>, 416]
    [12, (. 39) <o 353> (z 220) <i 133> (r 92) <e 79>, 454]
    [13, (. 39) <o 353> (z 220) <i 133> (g 106) <e 79>, 468].

Incidentally, since the word of the midway path 11 started with the category string ". ozi . e" is not present in the word dictionary 303, the validity judging unit 108 sends a subsequent candidate selection signal d to the best path selector 106. Then, the best path selector 106 selects the midway path 8, which has the second smallest estimation value next to the midway path 11, to send it to the validity judging unit 108. The validity judging unit 108 sends the midway path 8 to the path former 104 because the category string ". osi" of the midway path 8 is present in the word dictionary 303.

The path former 104 now forms the three midway paths 14, 15 and 16 from the midway path 8 to store them in the midway path memory 105. This midway path memory 105 is stored with the following twelve midway paths:

[1, (. 72) <u 451>, 658]
    [2, (p 112) <u 451>, 698]
    [3, (k 117) <u 451>, 703]
    [5, (p 46) <o 353>, 505]
    [6, (h 50) <o 353>, 509]
    [9, (. 39) <o 353> (z 838) <e 79>, 980]
    [10, (. 39) <o 353> (s 925) <e 79>, 1067]
    [12, (. 39) <o 353> (z 220) <i 133> (r 92) <e 79>, 454]
    [13, (. 39) <o 353> (z 220) i 133 (g 106) <e 79>, 468]
    [14, (. 39) <o 353> (s 227) i 133 (. 54) <e 79>, 423]
    [15, (. 39) <o 353> (s 227) i 133 (r 92) <e 79>, 667]
    [16, (. 39) <o 353> (s 227) i 133 (g 106) <e 79>, 475].

Next, of these, the midway path 14 having the minimum estimation value is sent to the validity judging unit 108. Since the category string ". osi . e" of the midway path 14 is also present in the word dictionary, the midway path 14 is sent to the path former 104. Likewise, the new midway paths 17, 18 and 19 are formed and additionally sent to the midway path memory 105. As a result, this midway path 105 is stored with the following fourteen midway paths:

[1, (. 72) <u 451>, 658]
    [2, (p 112) <u 451>, 698]
    [3, (k 117) <u 451>, 703]
    [5, (p 46) <o 353>, 505]
    [6, (h 50) <o 353>, 509]
    [9, (. 39) <o 353> (z 838) <e 79>, 980]
    [10, (. 39) <o 353> (s 925) <e 79>, 1067]
    [12, (. 39) <o 353> (z 220) <i 133> (r 92) <e 79>, 454]
    [13, (. 39) <o 353> (z 220) <i 133> (g 106) <e 79>, 468]
    [15, (. 39) <o 353> (s 227) <i 133> (r 92) <e 79>, 667]
    [16, (. 39) <o 353> (s 227) <i 133> (g 106) <e 79>, 475]
    [17, (. 39) <o 353> (s 227) <i 133>

(. 54) <e 79> (d 79) <e 0>, 399]

[18, (. 39) <o 353> (s 227) <i 133>

(. 54) <e 79> (t 84) <e 0>, 404]

[19, (. 39) <o 353> (s 227) <i 133>

(. 54) <e 79> (r 113) <e 0>, 433]

Since the estimation value of the midway path 17 is the minimum of the above, the midway path 17 is sent to the validity judging unit 108. The validity judging unit 108 parsed that the category string ". osi . ede" of the midway path 17 is ". osi . e" (i.e., "teach": verb in the form to be proposed)+ "de" (i.e., a postposed word functioning as an auxiliary to a noun). However, it is judged from the word connection table 304 that these two words cannot be connected, and hence that the midway path 17 is not valid. As a result, the subsequent candidate selection signal d is sent from the validity judging unit 108 to the best path selector 106 so that the midway path 18 having the next smallest estimation value:

[18, (. 39) <o 353> (s 227) <i 133>

(. 54) <e 79> (t 84) <e 0>, 404]

is sent to the validity judging unit 108. Then, it is parsed from the word dictionary that this category string ". osi . ete" is ". osi . e" (i.e., "teach": verb in the form to be preposed)+ "te" (i.e., a postposed word funtioning as an auxiliary to a verb). As a result, the validity judging unit 108 examines from the word connection table 304 whether the word "teach" (i.e., a verb in the form to be preposed) and the word "te" (i.e., a postposed word functioning as an auxiliary to a verb) can be connected. In this case, since the connection is possible and since the midway path 18 has reached the terminal node of the candidate graph, the validity judging unit 108 sends the category string ". osi . ete" to an end judging unit 109 and outputs it as the recognition result. At the same time, the unit 108 sends the subsequent candidate selection signal d to the best path selector 106.

The end judging unit 109 sends a selection end signal e to the best path selector 106 when a predetermined end condition is satisfied by the recognition result received from the validity judging unit 108. In case the operator finally judges in view of several recognition results, that end condition may be considered, for example, to be that the recognition results reaches one or more number.

The best path selector 106 terminates the selecting operation in response to the selection end signal e to stop the recognition system. The input pattern parser 101 awaits another input pattern.

The operation of the present embodiment has been exemplified hereinbefore. The number of all the paths in the candidate graph of FIG. 4 is 72. According to the prior art, the judgement of the validity has to be conducted for all the seventy two paths if all the paths are to be judged for their validity. Even if the validity is to be judged in the order of the path costs, the seventy two paths have to be prepared once. According to the present invention, however, the number of the midway paths prepared until the first recognition result is obtained is nineteen, of which the number of the midway paths judged for the validity is six. In the present invention, moreover, the validity judgement is conducted while the path length is short so that the computational effort can be reduced. On the other hand, reduction in the number of the paths to be formed comes from the fact that the accuracy of the estimation value is improved because the value h(n) for the estimation value is calculated on the basis of the measured value c(n) of the minimum cost, as has been described in connection with the formulas (1) and (2).

As has been described in detail hereinbefore, according to the present invention, the number of the paths to be formed is so reduced, and it becomes possible to determine only the category string which has a low path cost and a significance. Thus, it is possible to provide a pattern recognition system which takes small number of computational cost necessary for the recognition and which has a high recognizing accuracy.

The description thus far made is directed to the case in which the continuous utterance is to be recognized as the syllable sequence, as in the embodiment. Despite of this fact, however, the continuous utterance can be recognized as a word sequence if the words are used in place of the syllables as the category for the recognition. In this case, since the word recognition is better in the recognizing accuracy than the syllable recognition, it is possible to expect less computational cost and higher recognizing accuracy as a whole.

Moreover, a letter recognition system can be provided by preparing a drawing pattern of letters in place of the reference pattern of the syllables of the embodiment thus far described.

Moreover, the end judging unit 109 in the embodiment judges the end condition as to the recognition result. In addition, however, it can be said that the end condition is satisfied when a predetermined signal is received from the outside. Alternatively, the judgement of the end condition may be conducted in accordance with both the recognition result and the external signal.

In the present invention, incidentally, there has been used a data structure called the candidate graph. This may be expressed by using the data structure called the "candidate lattice", because both of them express essentially the candidates of the plural categories in the input pattern and their relationship.

What is claimed is:

1. A pattern recognizing system comprising:
   input pattern parsing means for parsing an input pattern to produce a candidate graph composed of several possible valid category segmenting nodes (n) which segment the input pattern into possibly valid category segments, the graph starting from a start node and ending at a terminal node, successive segmenting nodes being interconnected through at least one branch, each branch defining a possibly valid category segment and a cost as a measure of recognition accuracy being assigned to each branch by said input pattern parsing means, to thereby produce a plurality of possibly valid category strings each composed of a plurality of category segments successively connected through segmenting nodes (n);
   candidate graph memory means for storing said candidate graph;
   minimum cost calculating means receiving the candidate graph stored in the candidate graph memory means and for calculating for each node (n) of the segmenting nodes in the candidate graph, the minimum cost c(n) to reach the terminal node from the node (n) through any branches and midway nodes between the node (n) and the terminal node;
   midway path memory means for storing midway paths (p), each of which is a sequence of branches and nodes from the start node to each segmenting node (n);
   estimation calculating means for calculating an estimation value f (p, n) for each midway path (p), stored in the midway path memory, from the start node to the segmenting node (n) on the basis of the costs g(p) assigned to the branches constituting the midway path between the start node and the segmenting node (n) and the minimum cost (c)n calculated for that segmenting node (n) according to the formula, $f(p, n) = g(p) + h(n)$, wherein:
   g(p) designates the sum of the costs assigned to branches included in a midway path p; and h(n) designates an estimation value of a cost from a midway segmenting node (n), which is an end node of the midway path p to the terminal node;
   best path selecting means for selecting as the best midway path to the segmenting node (n) the path given the lowest estimation value by said estimation calculating means; and
   validity judgment means for determining if the best midway path selected by said best path selecting means is a valid portion of a category string for a recognition result and outputting the path as a recognition result if it is valid.

2. A pattern recognition system according to claim 1, further comprising: path forming means for extending a midway path from a segmenting node (n) to another typical additional node (n+1) and for storing the extended midway path formed in said midway path memory means; and end judging means for judging, in accordance with the recognition result outputted from said validity judging means, whether a predetermined end condition signifying an end the recognition operation is satisfied.

3. A pattern recognition system according to claim 2, wherein said end judging means judges an end of the recognition process when a predetermined number of said recognition results are obtained.

4. A pattern recognition system according to claim 1, wherein said minimum cost calculating means includes means for determining the minimum cost c(n) of a midway node n on the basis of the following formula: under an initial condition of c(N)=0, $$c(n) = \min(\lambda \min_m d(n,j,m) + c(j)\gamma)$$
$$n < j \leq N$$
$$(n = N, N-1, \ldots, \text{and } 1);$$

wherein: the nodes of said candidate graph are designated at n (n=1, ..., i, ..., j, ..., and N; in which 1 designates the start node; and N designates the terminal node); and the cost from the node i to the node j is designated as d(i,j,m) (m=1, ..., and M(i,j), in which M(i,j) designates the number of branches between the node i and the node j).

5. A pattern recognition system according to claim 1, wherein said means for determining said estimation value f(p,n) further includes means for determining the estimation cost h(n) from the following formula:

$$h(n) = K \times c(n),$$

wherein: K designates a predetermined value and c(n) designates minimum a cost calculated for the midway node by said minimum cost calculating means.

6. A pattern recognition system according to claim 1, wherein said input pattern parsing means includes:
an input pattern buffer for storing said input pattern;
a vowel memory for storing predetermined vowel patterns;
a consonant memory for storing predetermined consonant patterns;
a vowel candidate detector for detecting vowel candidates having matching distances smaller than a predetermined value by matching an input pattern read out from said input pattern buffer and vowel patterns read out from said vowel memory to output data containing positions at which said vowels exist in the input pattern and categories of said vowels;
a consonant candidate detector for detecting consonant candidates having matching distances smaller than a predetermined value by matching an input pattern read out from said input pattern buffer memory and consonant patterns read out from said consonant memory to output categories of said consonants; and
a candidate graph former for forming a candidate graph in which a start end of said input pattern and the positions of said vowel patterns are used as nodes, in which said consonant candidates are used as branches between said nodes and in which said matching distances of said consonant candidates are assigned as costs to said branches.

7. A pattern recognition system according to claim 6, wherein both the consonants detected by said consonant candidate detector and the consonants stored in said consonant memory are segments of vowel-consonant sequences CV which contain a first consonant and a front portion of a vowel positioned after said consonant.

8. A pattern recognition system according to claim 6, wherein both the consonants detected by said consonant candidate detector and the consonants stored in said consonant memory are segments of vowel-consonant-vowel sequences VCV which contain a rear portion of a vowel positioned before a second consonant and a front portion of a vowel postponed after said second consonant.

9. A pattern recognition system according to claim 1, wherein said validity judging means includes: a category memory for storing category strings of valid words in advance; a word connection memory for storing valid connections of said valid words; a category string extractor for extracting a category string from the midway path from said best path selecting means; and judging whether the category string extracted is part of the category string of a valid word stored in said category memory or a concatenated valid word according to the valid connections stored in said word connection memory.

10. A pattern recognition method comprising the steps of:
segmenting a sequential input pattern into a plurality of category segments to each of which is assigned a cost, adjacent segments being interconnected through segmenting nodes (n) which segment the input pattern into possibly valid category segments, there being a start node, a terminal node and at least one midway node, said segments forming branches leading to and from segmenting nodes (n), segments interconnected through nodes forming paths;
determining a best midway path from the start node to a midway segmenting node (n) in which an estimation value is minimized, estimation values f(p, n) being determined both by the cumulating of the costs of the branches forming the midway paths from the start node to said midway segmenting node (n) and by an estimation cost determined by multiplying a predetermined value and the minimum of the costs of the paths from said midway segmenting node (n) to the terminal node according to the formula, $f(p, n) = g(p) + h(n)$, wherein:
g(p) designates the sum of costs assigned to branches included in a midway path p;
h(n) designates an estimation value of a cost from a midway segmenting node n, which is an end node of the
midway path p to the terminal node; and
$h(n) = K \times c(n)$, wherein:
c(n) designates a minimum of the cumulated costs from the midway segmenting node n to the terminal node; and
K is an average estimation value; and
determining if the best midway path defines a valid interconnection of category segments;

selecting as the best valid midway path that path providing the lowest estimation value which defines a valid interconnection of category segments;

extending the best valid midway path through the branches between said midway segmenting node (n) and another segmenting node (n+1);

determining the best midway path defined as the extended midway path having the lowest estimation value with a valid interconnection of category segments;

continuing to extend the best valid midway path until a recognition result is judged to have been established.

* * * * *

UNITED STATES PATENT AND TRADEMARK OFFICE
CERTIFICATE OF CORRECTION

PATENT NO.    :   4,926,483
DATED         :   May 15, 1990
INVENTOR(S)   :   Kaichiro HATAZAKI and Takao WATANABE It is certified that error appears in the above-identified patent and that said Letters Patent is hereby corrected as shown below:

Col. 11, line 23, delete

"$(\lambda \min_m d(n,j,m) + c(j)y)$" and insert

--$(\min_m d(n,j,m) + c(j))$--

Signed and Sealed this

Seventeenth Day of September, 1991

Attest:

HARRY F. MANBECK, JR.

*Attesting Officer*    Commissioner of Patents and Trademarks